QUARTZ PIEZOELECTRIC ELEMENT

Original Filed July 5, 1961 4 Sheets-Sheet 1

INVENTOR.
LELAND T. SOGN
BY Wade Lonty
ATTORNEY
James S. Shannon
AGENT

QUARTZ PIEZOELECTRIC ELEMENT

Original Filed July 5, 1961 4 Sheets-Sheet 2

INVENTOR.
LELAND T. SOGN
BY Wade Lewis ATTORNEY
James S. Shannon AGENT

QUARTZ PIEZOELECTRIC ELEMENT

Original Filed July 5, 1961 4 Sheets-Sheet 3

INVENTOR.
LELAND T. SOGN
BY Wm. Scott
ATTORNEY
James S. Hamma
AGENT

QUARTZ PIEZOELECTRIC ELEMENT

Original Filed July 5, 1961 4 Sheets-Sheet 4

FREQ: 525.170 Kc/s
$\theta$ = -52° 17'
$\frac{w}{l}$ = .218

FREQ: 511.730 Kc/s
$\theta$ = -52° 17'
$\frac{w}{l}$ = .227

FREQ: 490.250 Kc/s
$\theta$ = -52° 17'
$\frac{w}{l}$ = .243

INVENTOR.
LELAND T. SOGN
BY Walter Root
ATTORNEY
James S. Shannon
AGENT

United States Patent Office

Re. 25,413
Reissued July 9, 1963

25,413

QUARTZ PIEZOELECTRIC ELEMENT

Leland T. Sogn, Montgomery County, Ohio
(3791 Kingswood Drive, Dayton 29, Ohio)

Original No. 3,072,806, dated Jan. 8, 1963, Ser. No. 122,042, July 5, 1961. Application for reissue Feb. 8, 1963, Ser. No. 257,353
10 Claims. (Cl. 310—9.5)
(Granted under Title 35, U.S. Code (1952), sec. 266)

Matter enclosed in heavy brackets [ ] appears in the original patent but forms no part of this reissue specification; matter printed in italics indicates the additions made by reissue.

The invention described herein may be manufactured and used by or for the United States Government for governmental purposes without payment to me of any royalty thereon.

This invention relates to quartz piezoelectric vibrators for use as high-Q resonant elements in oscillator and filter circuits. In particular it is the purpose of the invention to provide a quartz element for use in the 150–1200 kc./s. frequency range, and principally in the 200–800 kc./s. portion of this range, that has characteristics superior to elements formerly specified for these frequencies. The points of superiority are a smaller variation of frequency with temperature over a considerably wider temperature range, a lower series arm resistance and therefore a higher Q, and, of particular importance in filters, less tendency to vibrate in undesired modes. Because of these properties and the orientation simplicity, fabrication to specification is less difficult which results in lower production costs.

The quartz element to be described, hereafter referred to as the SL cut, belongs to the group of rotated Y-cut elements some well known members of which are the AT, BT, CT and DT cuts. The SL cut differs from other members of the group in the angle of rotation, although the DT is close in this respect, in having a width/length ratio considerably less than unity, whereas the other members are square, and in vibrating in a different mode which is a combination of face-shear and length-width flexure.

Figure 1:
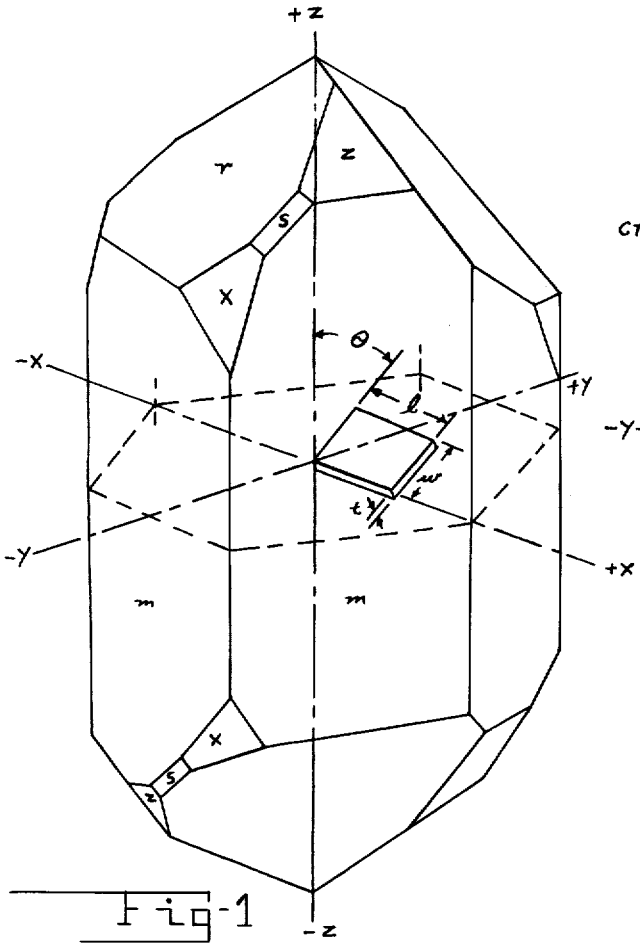
Figure 2:
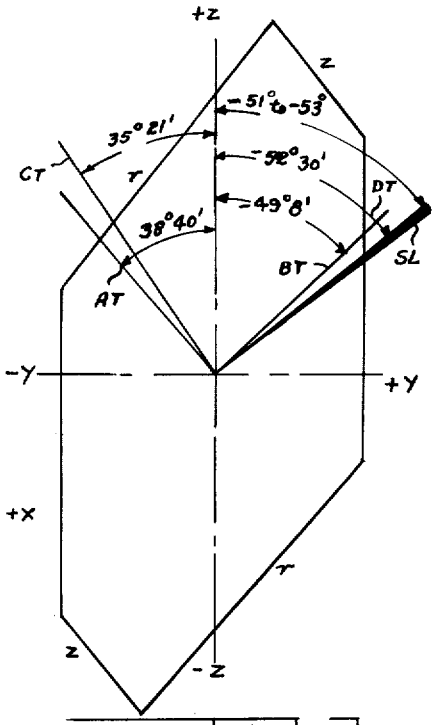
Figure 1A:
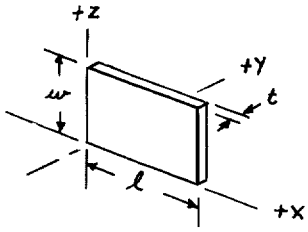

The invention will be described in more detail with reference to the accompanying drawings in which FIG. 1 illustrates the position of the SL cut in a quartz crystal, FIG. 1a illustrates the initial position in the orientation process, FIG. 2 shows the relationship of the SL cut to other cuts of the rotated Y-cut group with respect to rotation angle.

Figure 3:
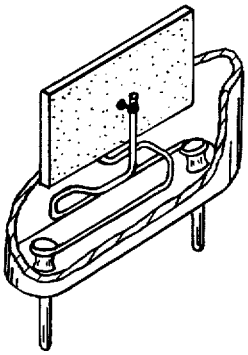
Figure 4:
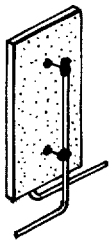
Figure 5A:
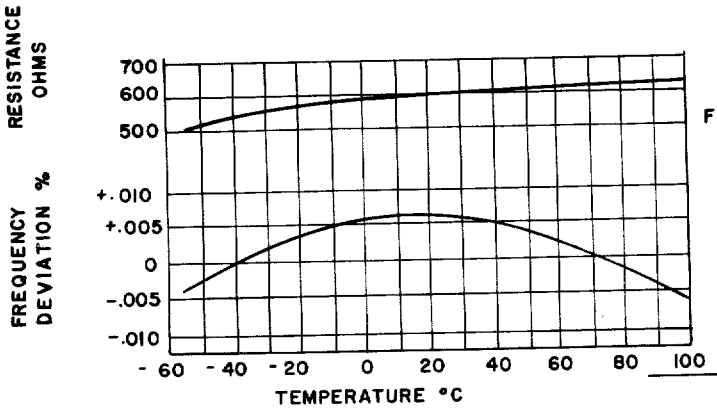
Figure 5B:
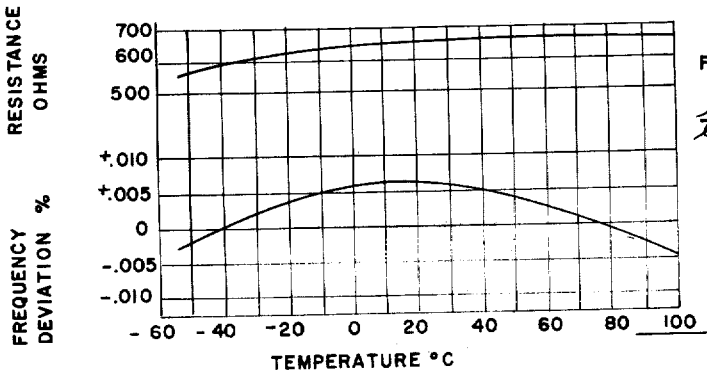
Figure 5C:
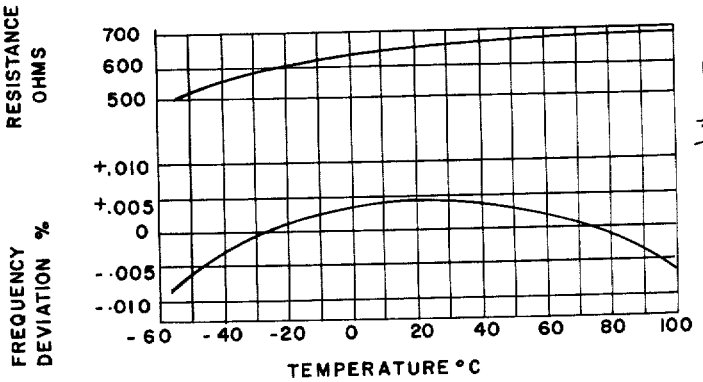
Figure 6A:
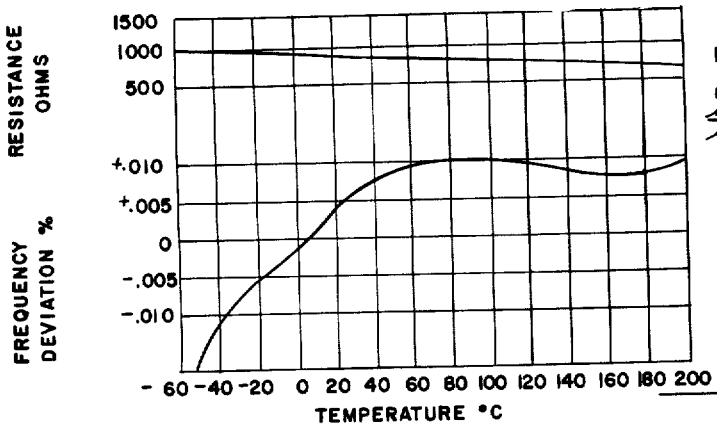
Figure 6B:
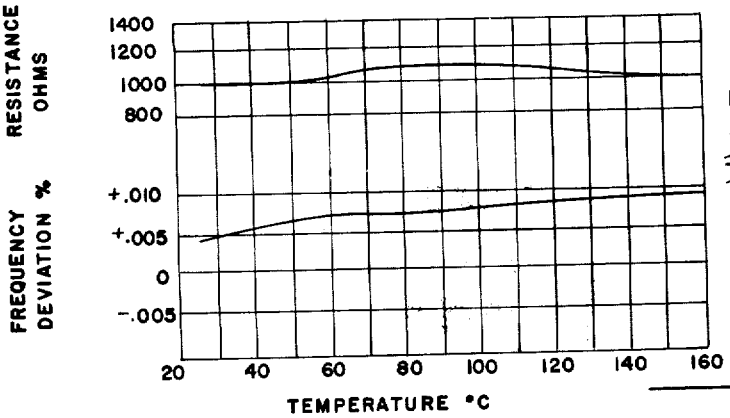
Figure 6C:
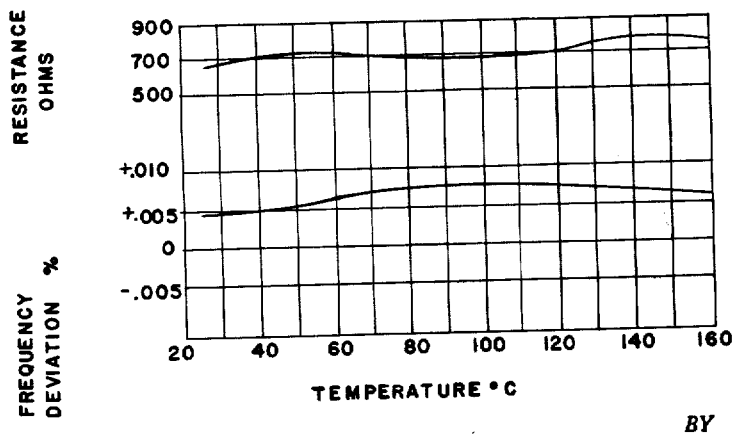
Figure 7A:
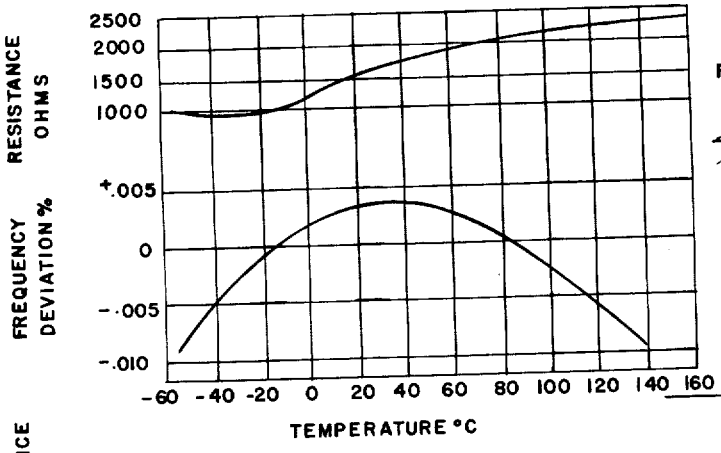
Figure 7B:
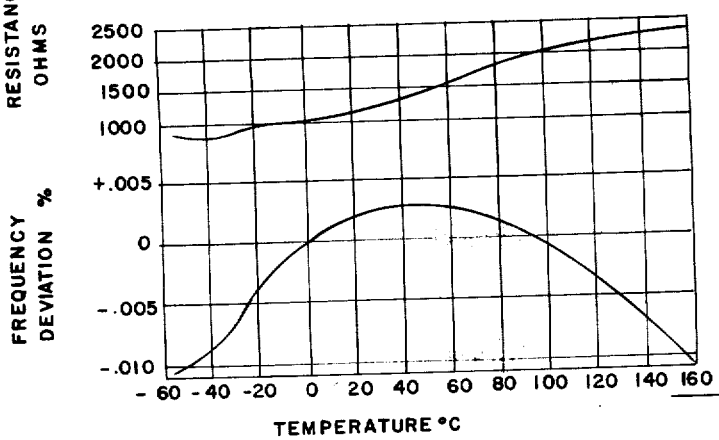
Figure 7C:
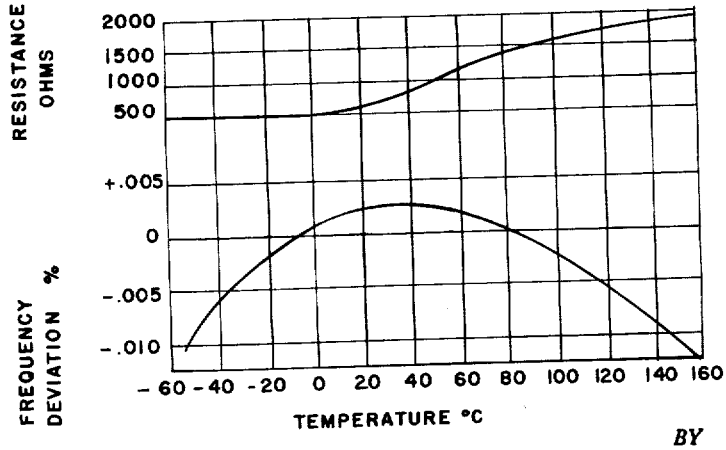

FIGS. 3 and 4 illustrate satisfactory methods of mounting SL cut plates,

FIGS. 5a, 5b and 5c show the temperature-frequency and the temperature-resistance characteristics for three SL vibrators designed to operate on the fundamental of the face-shear mode coupled to the [fundamental] *second overtone* of the length-width flexure mode in the −55° C. to 100° C. range, FIGS. 6a, 6b and 6c show the temperature-frequency and temperature-resistance characteristics for three SL vibrators designed for operation as in FIGS. 5a, b and c but in a higher temperature range, and FIGS. 7a, 7b and 7c give the temperature-frequency and temperature-resistance characteristics for three SL vibrators designed for operation on the fundamental of the face-shear mode coupled to the [second] *fourth* overtone of the length-width flexure mode.

In describing the orientation of the SL cut the generally adopted convention proposed by the Institute of Radio Engineers in 1949 will be followed. In this system a crystal plate is defined with respect to a rectangular set of X, Y and Z axes which have a specified relationship to the natural features of the quartz crystal. FIG. 1 shows a set of X, Y and Z axes and their relationship to the features of an idealized right-handed quartz crystal. These axes are not unique but merely define directions. Accordingly, any point in the crystal may be the point of origin of a set of axes parallel to the axes shown. The relationships of the three axes to the crystal's features are as follows:

The Z axis is the longitudinal direction of the quartz prism and is perpendicular to the growth lines of the prism faces m. The choice of +Z and −Z directions is arbitrary for both right and left crystals. The Z axis has threefold symmetry, i.e. the crystallographic features repeat each 120° about the axis.

The Y axis is at right angles to the Z axis and to the growth lines of the m faces. For either right or left quartz the +Y axis emerges from an m face that is adjoined by a z face at the +Z end of the crystal.

The X axis is at right angles to both the Y and the Z axes. It is also parallel to the growth lines of the m faces and to the lines bisecting the 120° angles between adjacent m faces. The positive end of the X axis is such as to form a right-handed coordinate system with the Y and Z axes, i.e. if the X axis is considered to be a right-hand screw it will move in the +X direction when rotated in the +Y to +Z direction. Considering the quartz crystal to be divided into two halves by a centrally located YZ plane, in right-handed quartz the +X axis emerges from the half having two prism edges terminating in x faces, whereas in left-handed quartz the +X axis emerges from the half having only one prism edge terminating in x faces.

Due to the threefold symmetry of the quartz crystal about the Z axis, it is apparent that each point in the crystal may serve as the origin of three rectangular XYZ coordinate systems having a common Z axis.

The orientation of a blank to be cut from the mother crystal is specified with respect to the X, Y and Z axes and is therefore independent of the handedness of the crystal. The crystal bank is assumed to have a hypothetical initial position with one corner at the origin of the coordinate system and the thickness, length and width lying in the directions of the rectangular axes. There are six possible initial positions, each of which is specified by two letters, the first letter indicating the thickness axis and the second letter indicating the length axis. The six initial positions are thus designated xy, xz, yx, yz, zx and zy. The initial position is so chosen that the final orientation may be reached with a minimum number of rotations. The dimensions of the blank and the axes of rotation are designated by the symbols t, l and w, for thickness, length and width, respectively. Three rotations are the maximum number possible. The three angles of rotation are designated $\phi$, $\theta$ and $\psi$ for rotations about the dimensions initially lying in the directions of the Y, X and Z axes, respectively. Only the initial rotation will be about an X, Y or Z axis, however the axes for subsequent rotations retain the signs of the axes they initially paralleled. The sign of the angles of rotation are determined by the right-hand screw convention, the angle being positive when advancing a right-hand screw toward the positive end of the axis and negative when advancing it toward the negative end of the axis. The complete specification of a crystal blank orientation therefore consists of two of the letters x, y and z indicating the initial position of the blank, followed by one or more of the letters t, l and w indicating the successive axes of rotation, followed by the magnitudes and signs of the angles $\phi$, $\theta$ and $\psi$.

Following the above convention, the initial position of the SL cut is shown in FIG. 1a. Since the thickness dimension is in the direction of the Y axes and the length dimension is in the direction of the X axes, the initial position is designated yx. The final position of the SL cut is shown in FIG. 1. It is reached from the initial position by a single rotation about its length dimension which, since it is the initial rotation, is also the X axis. Since there are no rotations about t or w, these axes and the corresponding [angle] *angles* $\phi$ and $\psi$, which are both zero, do not appear in the specification. Following the right-hand screw convention, it is seen in FIG. 1 that the angle $\theta$, designating the rotation about the length dimension and the X axis, is negative since it is in such direction as to move a right-hand screw toward the negative end of the X axis. For the SL cut the angle $\theta$ lies in the range $-51°$ to $-53°$. Therefore the orientation specification for the SL cut is yxl $-51°$ to $-53°$.

FIG. 2 shows the orientation of the SL cut relative to other well known rotated Y cuts. This diagram is correct for both right-hand and left-hand quartz. It will be noted that the negative direction of the angle $\theta$ rotates the crystal blank toward parallelism with an r apex face and the positive direction toward parallelism with a z apex face.

For the SL cut vibrator, the exact value of $\theta$, within the range $-51°$ to $-53°$, required to obtain the optimum temperature-frequency characteristic varies with the temperature range and also, to a lesser extent, with the value of w/l, the width-length ratio. As stated before, the vibrating mode of the SL plate is a combination of flexure and face-shear. For operation on the fundamental of the face-shear mode coupled to the [fundamental] *second overtone* of the length-width flexure mode the value of w/l should fall within the range .35 to .45.

For operation over the temperature range $-55°$ C. to 90° C. a value of $\theta$ of $-51°17'$ and a value of w/l of approximately .40 are preferred. FIGS. 5a, 5b and 5c show the temperature-frequency and temperature-resistance characteristics of three SL cut vibrators for operation in this temperature range. In the case of the vibrator represented in FIG. 5b, for which $\theta=-51°17'$ and w/l=.40, the maximum deviation from the mean frequency over the temperature range $-55°$ C. to 90° C. is $\pm.0042\%$.

For operating at higher temperatures, using plates with a w/l ratio of approximately .40, an angle of $-52°17'$ is preferred. Increasing the angle has the effect of raising the turning point, or point of zero temperature coefficient, of the temperature-frequency curve until, at $\theta=-52°17'$ and w/l ratio of approximately .40, the turning point tends to disappear and the frequency of the vibrator remains practically constant up to temperatures as high as 160° C. and 200° C., the highest temperature investigated. FIGS. 6a, 6b and 6c give the temperature-frequency and temperature-resistance characteristics of three SL vibrators for operation in the temperature range extending from room temperature up to 160° C. and beyond. In FIG. 6a, where $\theta=-52°17'$ and w/l=.41, the maximum deviation from the mean frequency in the temperature range 25° C. to 200° C. is $\pm.002\%$. In FIG. 6c, where $\theta=-52°17'$ and w/l=.401, the maximum deviation from the mean frequency in the range 25° C. to 160° C. is $\pm.0014\%$. The conditions in FIG. 6b are the same as in FIG. 6c except that the value of w/l is reduced to .384. This raises the frequency variation to $\pm.0025\%$. The vibrators of FIGS. 6a and 6c are also well suited to controlled temperature operation in the 80° C.–90° C. range.

SL vibrators may be operated on the fundamental of the face-shear mode coupled to the [second] *fourth* overtone of the length-width flexure mode by reducing the w/l ratio to the range .20 to .26, the preferred values being in the range .22 to .23. These have electrical characteristics comparable to those of the coupled [fundamental] *second overtone* mode vibrators described above. The preferred value of $\theta$ is again $-52°17'$. The characteristics of three plates operated in the coupled [second] *fourth* overtone mode with slightly different w/l ratios are shown in FIGS. 7a, 7b and 7c. Particular advantages of this mode of operation are the relatively low resistance, which is less than 50% of the resistance usually associated with this frequency range, and the improved temperature-frequency response at high temperatures.

For frequencies below 600 kc./s. the thickness dimension of an SL vibrator may lie in the range .015" to .020". For higher frequencies a reduction in the thickness dimension is considered advisable. *However, the thickness dimension is not critical and satisfactory operation may be obtained over a rather wide range of values.*

The length dimension of an SL vibrator for a particular frequency is determined from the relationship $$1\ (\text{inches})=\frac{K}{f(\text{kc./s.})}$$

The value of K is dependent upon the value of the width/length ratio and upon whether the face-shear fundamental is coupled to the [fundamental or an] *second, fourth or higher* overtone of the length-width flexure mode. For coupled [fundamental] *second overtone* operation and w/l=.40, K has a value of 181.5. For coupled [second overtone] *fourth overtone* operation and w/l=.229, K has a value of 295. The width may be determined from the length using the w/l ratio.

For best performance, the following orientation tolerances should be observed:

| | ′ of arc |
|---|---|
| Angle $\theta$ | $\pm3$ |
| Angle $\phi$ | $\pm15$ |
| Angle $\psi$ | $\pm30$ |

The angles $\phi$ and $\psi$ are of course both zero in the SL cut. Also, parallelism of the major faces of the vibrator should be maintained as closely as possible. Non-parallelism, which usually takes the form of a slight convexity or tapering from center to edges and corners, results chiefly in a reduction in motional inductance and Q of the vibrator and an increase in equivalent resistance. Parallelism of the long edges should also be maintained because loss of parallelism amounts to a change in the angle $\phi$, which would adversely affect the temperature-frequency characteristic and the electrical parameters of the vibrator.

Mounting techniques employed in the fabrication of face-shear and other types of low frequency vibrators are applicable to the manufacture of SL cut vibrators. An example is the center-mounted plate illustrated in FIG. 3. In this type of mounting the crystal faces are provided with conductive coatings to form integral electrodes and two supporting lead wires are attached to small paste silver buttons located at the center of each face of the crystal element by means of small solder cones. The outer ends of the lead wires are then fastened by solder balls to the top ends of supporting spring wires leading from the pin terminals of the enclosing container. [Although the] *The* center position for supporting wire attachment, which is at a vibration node for the fundamental of the principal face-shear mode, is [not] *also* at a node for the [fundamental and odd-order] *even order* overtones of the coupled length-width flexure mode. [, excellent results have been achieved and no detrimental effects have been noted. One very important advantage of mounting away from a nodal point is that changes occurring in the solder and silver buttons used to secure the lead wires to the crystal have no perceptible effect on the vibrating crystal. A second equally important advantage is the ability of vibrators so mounted to maintain high activity even at temperatures near the melting point of the solder.] Mounting of vibrators by attaching the lead wires to nodal positions *on either side of the central nodal position* of the coupled length-width flexure, as indicated in FIG. 4 for the [fundamental] *second overtone* of the coupled mode, may be employed if crystal units are to be operated in environments in which they may be subjected to conditions of severe shock and vibration. [However, loss of the above advantages and increased cost result.]

I claim:

1. A quartz piezoelectric element designed to vibrate at the fundamental of the face-shear mode coupled to the [fundamental] *second overtone* of the length-width flexure mode, said element being a rectangular plate rotated about its length dimension from an initial position in which its thickness dimension is parallel to the Y axis of the mother crystal and its length dimension is parallel to the X axis of the mother crystal through an angle falling within the range −51° to −53°, said plate having a width/length ratio falling within the range .35 to .45.

2. A quartz piezoelectric element designed to vibrate at the fundamental of the face-shear mode coupled to the [second] *fourth* overtone of the length-width flexure mode, said element being a rectangular plate rotated about its length dimension from an initial position in which its thickness dimension is parallel to the Y axis of the mother crystal and its length dimension is parallel to the X axis of the mother crystal through an angle falling within the range −51° to −53°, said plate having a width/length ratio falling within the range .20 to .26.

3. A quartz piezoelectric element designed to vibrate at the fundamental of the face-shear mode coupled to the [fundamental] *second overtone* of the length-width flexure mode and to operate in the temperature range −55° C. to 90° C., said element being a rectangular plate rotated about its length dimension from an initial position in which its thickness dimension is parallel to the Y axis of the mother crystal and its length dimension is parallel to the X axis of the mother crystal through an angle of approximately −51°17′, said plate having a width/length ratio of approximately .40.

4. A quartz piezoelectric element designed to vibrate at the fundamental of the face-shear mode coupled to the [fundamental] *second overtone* of the length-width flexure mode and to operate in the temperature range −55° C. to 90° C., said element being a rectangular plate rotated about its length dimension from an initial position in which its thickness dimension is parallel to the Y axis of the mother crystal and its length dimension is parallel to the X axis of the mother crystal through an angle of approximately −51°17′, said plate having a width/length ratio of approximately .40, and the length dimension of said plate in inches being approximately equal to 181.5 divided by the frequency in kilocycles per second.

5. A quartz piezoelectric element designed to vibrate at the fundamental of the face-shear mode coupled to the [fundamental] *second overtone* of the length-width flexure mode and to operate in the temperature range −55° C. to 90° C., said element being a rectangular plate rotated about its length dimension from an initial position in which its thickness dimension is parallel to the Y axis of the mother crystal and its length dimension is parallel to the X axis of the mother crystal through an angle of approximately −51°17′, said plate having a width/length ratio of approximately .40, the length dimension of said plate in inches being approximately equal to 181.5 divided by the frequency in kilocycles per second, and the thickness dimension of said plate being approximately .017 inch.

6. A quartz piezoelectric element designed to vibrate at the fundamental of the face-shear mode coupled to the [fundamental] *second overtone* of the length-width flexure mode and to operate in the temperature range 25° C. to 160° C. and above, said element being a rectangular plate rotated about its length dimension from an initial position in which its thickness dimension is parallel to the Y axis of the mother crystal and its length dimension is parallel to the X axis of the mother crystal through an angle of approximately −52°17′, said plate having a width/length ratio of approximately .40.

7. A quartz piezoelectric element designed to vibrate at the fundamental of the face-shear mode coupled to the [second] *fourth* overtone of the length-width flexure mode and to operate in the temperature range −55° C. to 160° C., said element being a rectangular plate rotated about its length dimension from an initial position in which its thickness dimension is parallel to the Y axis of the mother crystal and its length dimension is parallel to the X axis of the mother crystal through an angle of approximately −52°17′, said plate having a width/length ratio of approximately .22.

8. A quartz piezoelectric element designed to vibrate at the fundamental of the face-shear mode coupled to the [second] *fourth* overtone of the length-width flexure mode and to operate in the temperature range −55° C. to 160° C., said element being a rectangular plate rotated about its length dimension from an initial position in which its thickness dimension is parallel to the Y axis of the mother crystal and its length dimension is parallel to the X axis of the mother crystal through an angle of approximately −52°17′, said plate having a width/length ratio of approximately .22, and the length dimension of said plate in inches being approximately equal to 295 divided by the frequency in kilocycles per second.

9. Apparatus as claimed in claim 1 in which said element has conductive coatings on its faces to form integral electrodes and is supported in a holder by two lead wires attached to the element at the centers of said faces.

10. Apparatus as claimed in claim 2 in which said element has conductive coatings on its faces to form integral electrodes and is supported in a holder by two lead wires attached to the element at the centers of said faces.

UNITED STATES PATENTS

References Cited in the file of this patent or the original patent

| | | |
|---|---|---|
| 2,362,056 | Drews et al. | Nov. 7, 1944 |
| 2,423,061 | Bach | June 24, 1947 |
| 2,484,635 | Mason | Oct. 11, 1949 |